United States Patent
Choi

(10) Patent No.: US 7,950,359 B2
(45) Date of Patent: May 31, 2011

(54) VARIABLE VALVE SYSTEM

(75) Inventor: Myungsik Choi, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 399 days.

(21) Appl. No.: 12/130,519

(22) Filed: May 30, 2008

(65) Prior Publication Data

US 2009/0151673 A1 Jun. 18, 2009

(30) Foreign Application Priority Data

Dec. 14, 2007 (KR) .................. 10-2007-0131664

(51) Int. Cl.
F01L 1/34 (2006.01)
(52) U.S. Cl. .................. 123/90.15; 123/90.16
(58) Field of Classification Search ............... 123/90.15, 123/90.16
See application file for complete search history.

(56) References Cited

U.S. PATENT DOCUMENTS

| 4,129,109 | A | * | 12/1978 | Matsumoto | 123/198 F |
|---|---|---|---|---|---|
| 6,557,518 | B1 | * | 5/2003 | Albertson et al. | 123/198 F |
| 6,874,463 | B1 | * | 4/2005 | Bolander et al. | 123/198 F |
| 7,765,052 | B2 | * | 7/2010 | Kaiser et al. | 701/103 |
| 2003/0226543 | A1 | * | 12/2003 | Glugla et al. | 123/404 |
| 2007/0215081 | A1 | * | 9/2007 | Frincke et al. | 123/90.16 |
| 2008/0047509 | A1 | * | 2/2008 | Sellnau et al. | 123/90.15 |

FOREIGN PATENT DOCUMENTS

| JP | 7-71278 A | 3/1995 |
|---|---|---|
| KR | 2000-0017311 A | 3/2000 |

* cited by examiner

*Primary Examiner* — Thomas E Denion
*Assistant Examiner* — Daniel A Bernstein
(74) *Attorney, Agent, or Firm* — Morgan, Lewis & Bockius LLP

(57) ABSTRACT

A variable valve system includes a variable valve lifter for changing a first lift amount of one or more valves at a predetermined engine speed; a variable valve timing portion for controlling opening and closing timing of one or more valves; and a cylinder deactivation portion that changes a second lift amount of two or more valves in an alternating pattern.

3 Claims, 4 Drawing Sheets

FIG.4

|  |  | Group 1 | Group 2 |
|---|---|---|---|
| I4 | ① ② ③ ④ | Cyl. #2, #3 | Cyl. #1, #4 |
| V6 | ① ③ ⑤<br>② ④ ⑥ | Cyl. #1, #3, #5 | Cyl. #2, #4, #8 |
| V8 | ① ③ ⑤ ⑦<br>② ④ ⑥ ⑧ | Cyl. #1, #4, #6, #7 | Cyl. #2, #3, #5, #8 |

FIG.5

|  | Driving Condition | I4 / V6 / V8 | |
|---|---|---|---|
|  |  | Group 1 | Group 2 |
| Fuel Cut | RPM | CDA | CDA |
| Part Load | 2000 - 3500 rpm | CDA | WL(L, M, H) |
|  |  | VVL(L, M, H) | CDA |
|  | Idle - 2000 rpm | VVL(L, M, H) | VVL(L, M, H) |
| Full Load | Low Speed | M | M |
|  | High Speed | H | H |

VARIABLE VALVE SYSTEM

CROSS-REFERENCE TO RELATED APPLICATION

This application claims priority to, and the benefit of, Korean Patent Application No. 10-2007-0131664 filed in the Korean Intellectual Property Office on Dec. 14, 2007, the entire contents of which are incorporated herein by reference.

BACKGROUND OF THE INVENTION (a) Field of the Invention

The present invention relates to a variable valve system.

(b) Description of the Related Art

A variable valve lift (VVL) system changes a lift amount of an intake/exhaust valve of an engine according to driving conditions. Intake amount can be maximized at high speed/load and minimized at other times, to improve fuel efficiency and reduce exhaust gas.

A variable valve timing portion is provided at one end of each of the intake camshaft and the exhaust camshaft. Cylinder deactivation portions are provided at some of the cylinders. One hydraulic pressure line is provided for the cylinder deactivation portions and another hydraulic pressure line is provided for the variable valve timing portions.

However, when the cylinder deactivation portion continuously operates in a particular cylinder, an electric spark cannot be formed securely. Also, when the cylinder deactivation portion continuously operates in particular cylinder, the bore of the cylinder can be transformed.

The above information disclosed in this Background section is only for enhancement of understanding of the background of the invention and therefore it may contain information that does not form the prior art that is already known in this country to a person of ordinary skill in the art.

SUMMARY OF THE INVENTION

A variable valve system includes a variable valve lifter for changing a first lift amount of one or more valves at a predetermined engine speed; a variable valve timing portion for controlling opening and closing timing of one or more valves; and a cylinder deactivation portion that changes a second lift amount of two or more valves in an alternating pattern.

The variable valve lifter may control a rotation angle of a first control shaft to control a moving amount of a swing, arm, and/or control a rotation angle of a second control shaft to control a moving amount of a rocker arm.

The first lift amount may be high, low, or medium. The second lift amount may be on or off.

Two cylinder deactivation portions may be provided: a first one in a first cylinder, and a second one in a second cylinder. The system may alternately perform a first mode and a second mode. In the first mode, the first cylinder deactivation portion is operated, and the second is not. In the second mode, the first cylinder deactivation portion is not operated, and the second is.

BRIEF DESCRIPTION OF THE DRAWINGS

FIG. 4 is an arrangement table of a variable valve system according to an exemplary embodiment of the present invention.

FIG. 5 is a drive mode arrangement table of a variable valve system according to an exemplary embodiment of the present invention.

DETAILED DESCRIPTION OF PREFERRED EMBODIMENTS

The present invention will be described more fully hereinafter with reference to the accompanying drawings, in which exemplary embodiments of the invention are shown. As those skilled in the art will realize, the described embodiments may be modified in various different ways, all without departing from the spirit or scope of the present invention.

Figure 1:
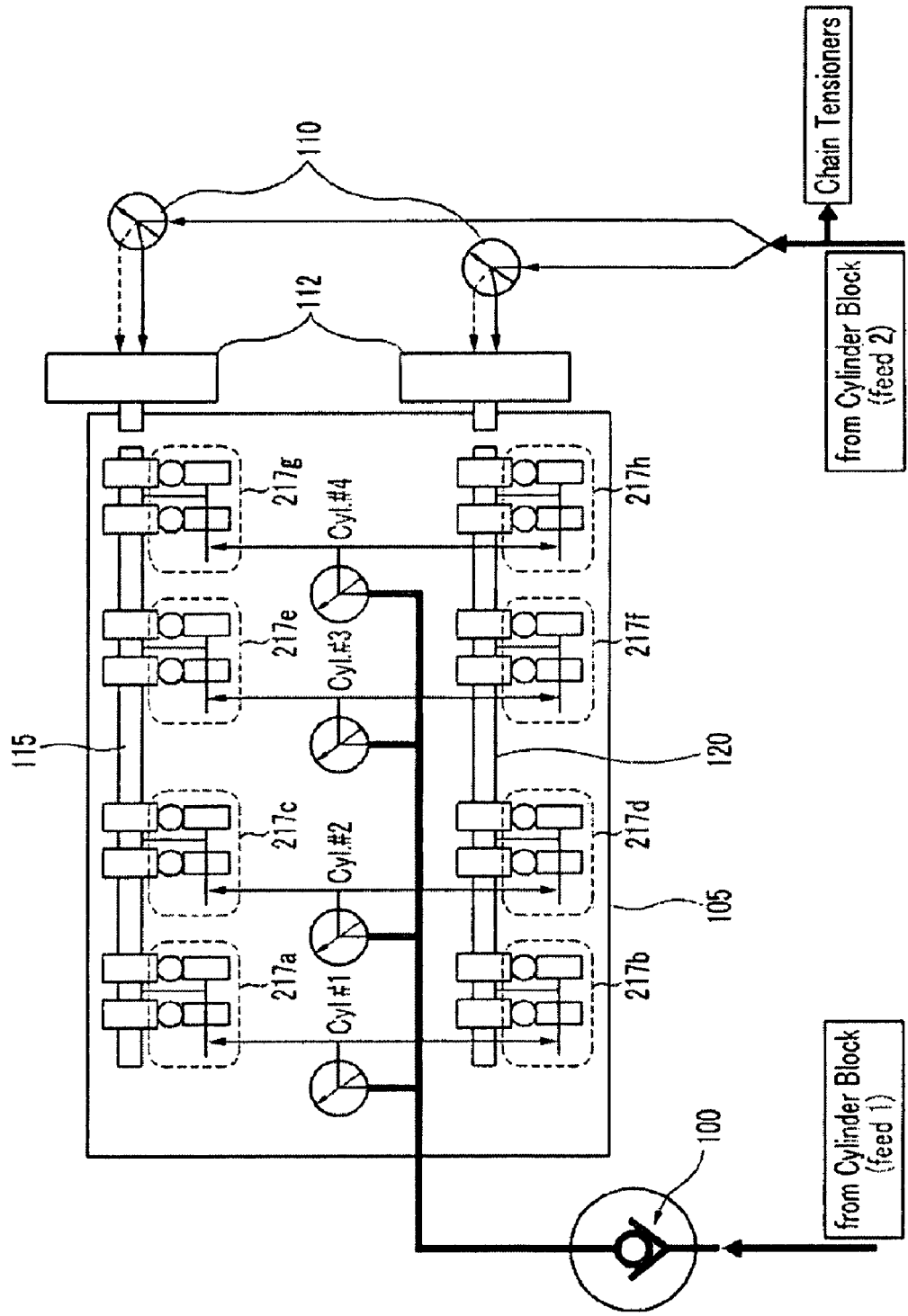
FIG. 1 is a first schematic diagram of a variable valve system according to an exemplary embodiment of the present invention.

As shown in FIG. 1, an engine 105 includes a first cylinder (cyl. #1) a second cylinder (cyl. #2), a third cylinder (cyl. #3), and a fourth cylinder (cyl. #4). Also, an exhaust camshaft 115 and an intake camshaft 120 arc disposed to the cylinders.

A first cylinder deactivation portion 217a for exhaust and a second cylinder deactivation portion 217b for intake are provided in the first cylinder (cyl. #1). A third cylinder deactivation portion 217c for exhaust and a fourth cylinder deactivation portion 217d for intake are provided the second cylinder (cyl. #2). A fifth cylinder deactivation portion 217e and a sixth cylinder deactivation portion 217f are provided in the third cylinder (cyl. #3). A seventh cylinder deactivation portion 217g and an eighth cylinder deactivation portion 217h are provided in the fourth cylinder (cyl. #4).

A first hydraulic pressure line is provided to cylinder deactivation portions 217a to 217h. A check valve 100 is provided in the first hydraulic pressure line. Control valves (e.g., solenoid valves) are disposed on branch lines that are extended to the cylinder deactivation portions 217a to 217h.

A variable valve timing portion 112 is disposed at one end of each camshaft 115, 120, and a second hydraulic pressure line is provided to the variable valve timing portions 112. A control valve 110 is disposed in branch lines to each of the camshafts 115 and 120.

The deactivation portions 217a to 217h arc operated alternately. This prevents spark plugs disposed in any one particular cylinder from becoming fouled by oil. Also, bore transformation of a particular cylinder is prevented.

Figure 2:
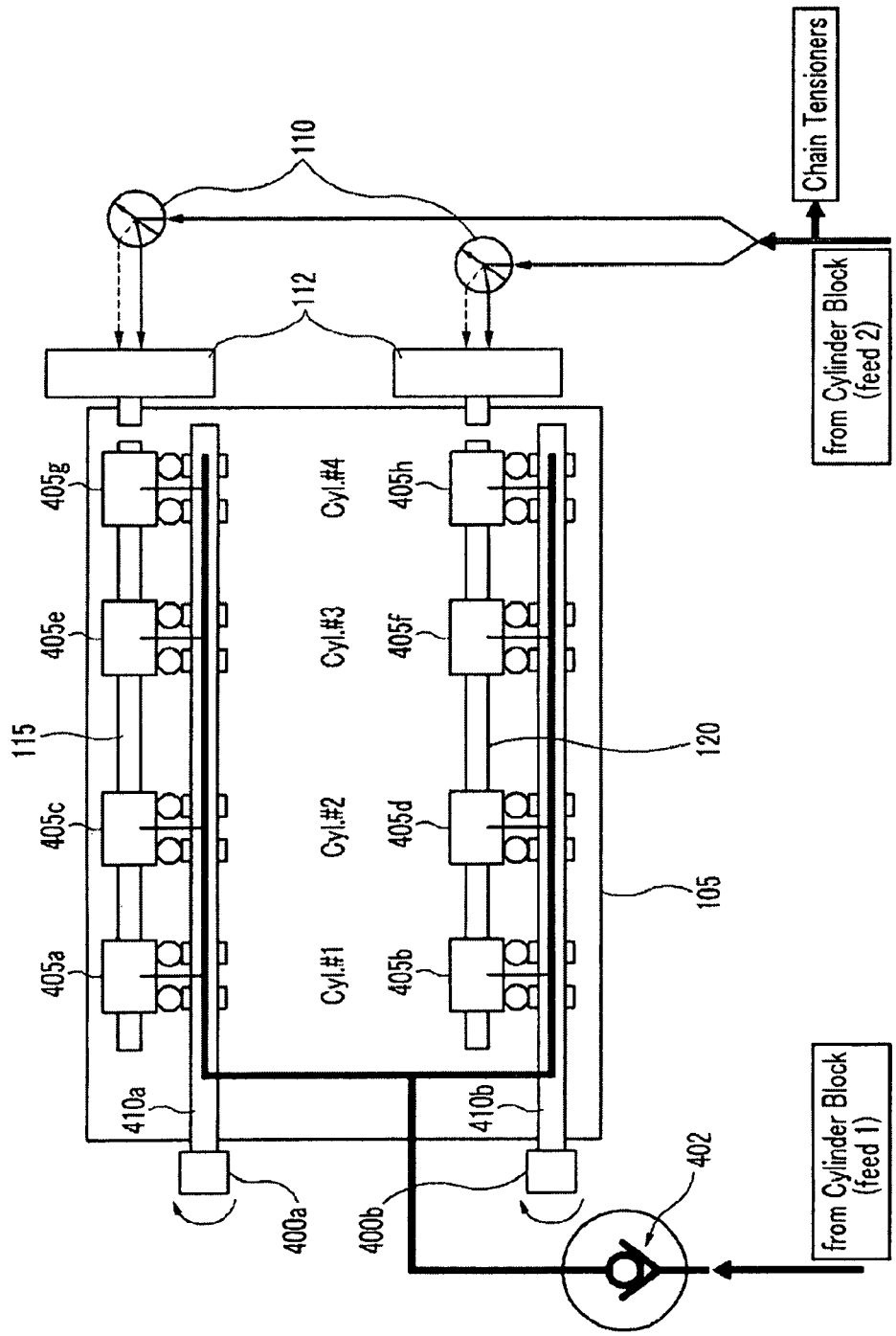
FIG. 2 is a second schematic diagram of a variable valve system according to an exemplary embodiment of the present invention.

Referring to FIG. 2, a first variable valve lifter 405a is provided in an exhaust port of the first cylinder (cyl. #1) and a second variable valve lifter 405b is provided in an intake port of the first cylinder (cyl. #1). A third variable valve lifter 405c and a fourth variable valve lifter 405d are provided in the second cylinder (cyl. #2). A fifth variable valve lifter 405e and a sixth variable valve lifter 405f are provided in the third cylinder (cyl. #3). A seventh variable valve lifter 405g and an eighth variable valve lifter 405h are provided in the fourth cylinder (cyl. #4).

The variable valve lifters 405a to 405h control a swing arm (not shown) so as to control a lift amount of the valve in FIG. 2. The valve controlled by the swing arm is adjusted in three steps of high, low, or medium.

A first control shaft 410a and a second control shaft 410b are provided so as to control the variable valve lifters 405a to 405h. The first control shaft 410a is provided at the exhaust side adjacent to the exhaust camshaft 115, and the second control shaft 410b is provided at the intake side adjacent to the intake camshaft 120.

Lifting distances of the exhaust valve and the intake valve are adjusted sequentially according to rotating positions of the first and second control shafts 410a and 410b.

A third hydraulic pressure line is provided to the first and second control shafts 410a and 410b. A check valve 402 is provided in the third hydraulic pressure line.

The first control shaft 410a simultaneously controls valves of the exhaust side and the second control shaft 410b simultaneously controls valves of the intake side.

A first rotation angle control motor 400a is provided at one end of the first control shaft 410a, and a second rotation angle control motor 400b is provided at one end of the second control shaft 410b.

Figure 3:
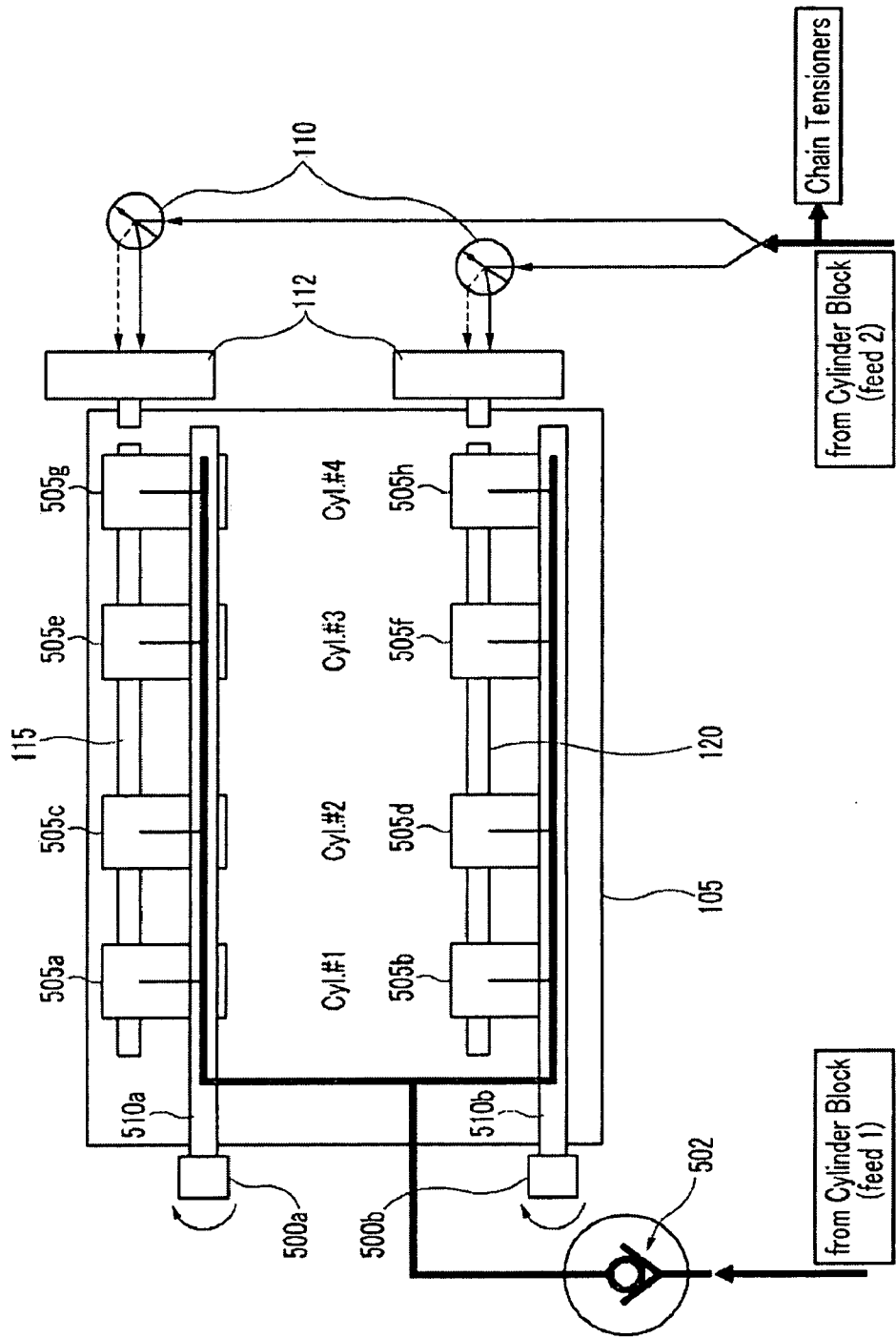
FIG. 3 is a third schematic diagram of a variable valve system according to an exemplary embodiment of the present invention.

Referring to FIG. 3, a ninth variable valve lifter 505a is provided in an exhaust port of the first cylinder (cyl. #1), and a tenth variable valve lifter 505b is provided in an intake port of the first cylinder (cyl. #1). A eleventh variable valve lifter 505c and a twelfth variable valve lifter 505d are provided in the second cylinder (cyl. #2). A thirteenth variable valve lifter 505c and a fourteenth variable valve lifter 505f are provided in the third cylinder (cyl. #3). A fifteenth variable valve lifter 505g and a sixteenth variable valve lifter 505h are provided in the fourth cylinder (cyl. #4).

The ninth to sixteen variable valve lifters 505a to 505h control a rocker arm (not shown) so as to control a lift amount of a valve in FIG. 3. The valve controlled by the rocker arm is adjusted in three steps of high, low, or medium.

A third control shaft 510a and a fourth control shaft 510b are provided so as to control the variable valve lifters 505a to 505h. The third control shaft 510a is provided at an exhaust side and adjacent to the exhaust camshaft 115, and the fourth control shaft 510b is provided at an intake side and adjacent to the intake camshaft 120.

Lifting distances of the exhaust valve and the intake valve are adjusted continuously according to rotating positions of the third and fourth control shafts 510a and 510b.

A fourth hydraulic pressure line is provided to the third and fourth control shafts 510a and 510b. A check valve 502 is provided in the fourth hydraulic pressure line. The third control shaft 510a simultaneously controls valves of the exhaust side and the fourth control shaft 510b simultaneously controls valves of the intake side.

A third rotation angle control motor 500a is provided at one end of the third control shaft 510a, and a fourth rotation angle control motor 500b is provided at one end of the fourth control shaft 510a.

As shown in FIG. 4, an I4 engine has four cylinders (cyl. #1, 2, 3, 4), where the second and third cylinders (cyl. #2, 3) are classified into a first group, and the first and fourth cylinders (cyl. #1, 4) are classified into a second group. The first group and the second group are alternately deactivated in the I4 engine.

The variable valve lift system can be operated in different cylinders when cylinders are alternately deactivated. The variable valve lift system includes systems that are operated by a rocker arm or a swing arm.

The first, third, and fifth cylinders (cyl, #1, 3, 5) and the second, fourth, and sixth cylinders (cyl, #2, 4, 6) are alternately deactivated in a V6 engine. The first, fourth, sixth, and seventh cylinders (cyl, #1, 4, 6, 7) and the second, third, fifth, and eighth cylinders (cyl, #2, 3, 5, 8) are alternately deactivated in a V8 engine.

Referring to FIG. 5, all cylinder deactivation portions (CDA) in group 1 and group 2 are operated in a fuel cut state.

When the cylinder deactivation portions (CDA) in group 1 are operated in a range from 2000 to 3500 rpm, the variable valve lifter (VVL) can be operated in three steps of high, low, or medium in group 2. Also, when cylinder deactivation portions (CDA) of group 2 are operated in a range from 2000 to 3500 rpm, the variable valve lifter (VVL) can be operated in three steps of high, low, or medium in group 1. The variable valve lifters (VVL) of groups 1 and 2 are operated and the cylinder deactivation portions (CDA) of groups 1 and 2 are not operated from idle to 2000 rpm.

At full load, the variable valve lifter (VVL) is operated in medium at a low speed and the variable valve lifter (VVL) is operated in high at a high speed. The cylinder deactivation portion (CDA) does not operate at a full load.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A variable valve system for use in an engine comprising a plurality of valves, the system comprising:
   a variable valve lifter for changing a first lift amount of one or more of the valves at a predetermined engine speed;
   a variable valve timing portion for controlling opening and closing timing of one or more of the valves; and
   a cylinder deactivation portion that changes a second lift amount of two or more of the valves in an alternating pattern;
   wherein the cylinder deactivation portion comprises a first cylinder deactivation portion in a first cylinder group, and a second cylinder deactivation portion in a second cylinder group;
   wherein the system is configured to alternatively perform a first mode and a second mode;
   wherein the first mode comprises the first cylinder deactivation portion being operated and the second cylinder deactivation portion not being operated; and
   wherein the second mode comprises the first cylinder deactivation portion not being operated and the second cylinder deactivation portion being operated; and
   wherein a first control shaft is provided along the first cylinder group, a second control shaft is provided along the second cylinder group, and the first control shaft and the second control shaft are rotated by control motors.

2. The variable valve system of claim 1, wherein the first lift amount is high, low, or medium.

3. The variable valve system of claim 1, wherein the second lift amount is on or off.

* * * * *